(12) United States Patent
Nuka et al.

(10) Patent No.: US 11,493,324 B2
(45) Date of Patent: Nov. 8, 2022

(54) OPTICAL AXIS BASED MEASURING APPARATUS

(71) Applicant: Mitutoyo Corporation, Kanagawa (JP)

(72) Inventors: Kuniyuki Nuka, Tokyo (JP); Motonori Ogihara, Kanagawa (JP); Takeshi Kawabata, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 221 days.

(21) Appl. No.: 16/903,056

(22) Filed: Jun. 16, 2020

(65) Prior Publication Data

US 2020/0400424 A1 Dec. 24, 2020

(30) Foreign Application Priority Data

Jun. 18, 2019 (JP) .............................. JP2019-112643

(51) Int. Cl.
*G01B 11/00* (2006.01)
*G01B 11/03* (2006.01)
(Continued)

(52) U.S. Cl.
CPC .......... *G01B 11/002* (2013.01); *G01B 11/005* (2013.01); *G01B 11/03* (2013.01);
(Continued)

(58) Field of Classification Search
CPC ..... G01B 11/03; G01B 11/002; G01B 11/005; G01S 7/497; G01S 17/66; G02B 27/0172
See application file for complete search history.

(56) References Cited

U.S. PATENT DOCUMENTS

2007/0024861 A1 2/2007 Yanaka et al.
2008/0316497 A1* 12/2008 Taketomi ............. G01C 15/002
356/498
(Continued)

FOREIGN PATENT DOCUMENTS

JP 2007-57522 3/2007
JP 2010-054429 3/2010

*Primary Examiner* — Michael P LaPage
(74) *Attorney, Agent, or Firm* — Rankin, Hill & Clark LLP

(57) ABSTRACT

It is an object of the present invention to provide a measuring apparatus capable of easily grasping a tracking state of a target and performing an efficient measurement. One aspect of the present invention is a measuring apparatus that emits a light beam toward a target, captures and tracks the target, and measures the three-dimensional coordinates of the target. The measuring apparatus comprises: a light source for emitting light beam; an angle control unit for controlling the emission angle of the light beam emitted from the light source so as to track the moving target; a display unit that provided on a device that is wearable by a measurer; a calculation unit for calculating the three-dimensional coordinates of the target based on the emission angle of the light beam and the light returning from the target; and a display control unit that controls information displayed on the display unit based on the three-dimensional coordinates calculated by the calculation unit. The display control unit performs control to superimposed and display the optical axis graphic image on a position of the optical axis of the light beam.

11 Claims, 12 Drawing Sheets

(51) Int. Cl.
*G01S 7/497* (2006.01)
*G02B 27/01* (2006.01)
*G01S 17/66* (2006.01)

(52) U.S. Cl.
CPC .............. *G01S 7/497* (2013.01); *G01S 17/66* (2013.01); *G02B 27/0172* (2013.01)

(56) References Cited

U.S. PATENT DOCUMENTS

| | | | | |
|---|---|---|---|---|
| 2016/0035136 | A1* | 2/2016 | Sendai | G06T 11/00 345/633 |
| 2018/0364483 | A1* | 12/2018 | Mallinson | A63F 13/24 |
| 2019/0178627 | A1* | 6/2019 | Bridges | G01S 17/66 |
| 2021/0250490 | A1* | 8/2021 | Miao | G01S 17/10 |

* cited by examiner

OPTICAL AXIS BASED MEASURING APPARATUS

CROSS-REFERENCE TO RELATED APPLICATION

This non-provisional application claims priority under 35 U.S.C. § 119(a) from Japanese Patent Application No. 2019-112643, filed on Jun. 18, 2019, the entire contents of which are incorporated herein by reference.

BACKGROUND

Technical Field

The present invention relates to a measuring apparatus for measuring three-dimensional coordinates of a target by capturing and tracking the target.

Background Art

As a measuring apparatus for measuring the three-dimensional coordinates of an object, there is a three-dimensional measuring apparatus for measuring the three-dimensional coordinates of a measurement point by irradiating a light beam such as a laser beam toward a target and capturing and tracking the moving target. With this measuring apparatus, the object such as a large structure can be easily and accurately measured by contacting the target in a tracking state to the surface of the object.

JP2007-057522A discloses a tracking type laser interferometer. In this tracking type laser interferometer, a laser beam is emitted toward a retroreflector which is an object to be measured, and displacement of the retroreflector is detected by utilizing interference of the laser beam reflected in the return direction by the retroreflector. At the same time, tracking is performed by using the angle change of the optical axis of the laser beam.

JP 2010-054429A discloses a laser tracker which is easy to use and can perform highly accurate measurement even if the measurement is interrupted while maintaining the required performance with a simple configuration. In this laser tracker, an optical position detecting means for outputting a signal corresponding to the direction of movement and the amount of movement when the target is moved in the direction perpendicular to the optical axis of the laser beam incident on the target. A rotation mechanism of the two axes are controlled so as to track the target using the signal output from the optical position detecting means.

SUMMARY OF THE INVENTION

Problems to be Solved by the Invention

In the measuring apparatus for performing measurement while tracking the target by irradiating a light beam, it is impossible to easily grasp whether or not it is in a tracking state. There may be a so-called lost state in which the target cannot be tracked for some reason, and in this case, a measurer who holds the target needs to move the target to a light receiving region of the light beam and restore the tracking state. However, since the trajectory of the light beam is hard to see, it is not easy to find the range in which the light can be received. Therefore, the measurer moves the target by relying on the intuition. In particular, in this type of measuring apparatus, the distance from the main body of the measuring apparatus to the object may be several tens of meters, it will take a lot of time to find a position where the light beam can be received as the distance increases.

It is an object of the present invention to provide a measuring apparatus capable of easily grasping a tracking state of a target and performing an efficient measurement.

Means for Solving the Problems

One aspect of the present invention is a measuring apparatus that emits a light beam toward a target, captures and tracks the target, and measures the three-dimensional coordinates of the target. The measuring apparatus comprises: a light source for emitting light beam; an angle control unit for controlling the emission angle of the light beam emitted from the light source so as to track the moving target; a display unit that provided on a device that is wearable by a measurer; a calculation unit for calculating the three-dimensional coordinates of the target based on the emission angle of the light beam and the light returning from the target; and a display control unit that controls information displayed on the display unit based on the three-dimensional coordinates calculated by the calculation unit. The display control unit performs control to superimpose and display to the display unit the optical axis graphic image along a line connecting the position of the light source and the position of the target.

According to such a configuration, in the measuring apparatus that emits a light beam toward the target to capture and track the light beam, the optical axis graphic image is displayed in a superimposed manner along the line connecting the position of the light source and position of the target on the display unit of the device to be worn by the measurer. That is, on the display area of the display unit, the optical axis graphic image is displayed at a display position corresponding to the actual position of the optical axis in a superimposed manner. Thereby, the optical axis of the light beam which is hard to see can be easily grasped by referring to the optical axis graphic.

In the above-described measuring apparatus, the angle control unit may stop the change of the emission angle of the light beam when the tracking of the target is released, and the display control unit may maintain the superimposed display of the optical axis graphic image at the timing when the tracking of the target is released. Thereby, the position of the optical axis at the timing when the tracking of the target is released can be easily grasped by referring to the optical axis graphic image.

In the above-described measuring apparatus, the display control unit may perform control to display the optical axis graphic image in a first mode when the target is being tracked, and to display the optical axis graphic image in a second mode that is different from the first mode when the tracking of the target is released. Thereby, the tracking state and the tracking released state of the target can be easily discriminated by the display mode of the optical axis graphic image.

In the above-described measuring apparatus, the device may include a sensor unit that acquires sensing information for calculating a relative position of the target with respect to the device. Then, in a state where the tracking of the target is released, the display control unit may perform control to superimpose and display a virtual object indicating a region in which the target can receive the light beam on the target using the sensing information and a second three-dimensional coordinates of the target calculated from the three-dimensional coordinates and the direction of the device. Thereby, when the tracking of the target is released, by referring to the virtual object, it is possible to easily restore the tracking state by moving the target to the position of this virtual object. Incidentally, the information for calculating the relative position of the target with respect to the device may be, for example, an image of the target captured by the imaging unit, the depth information acquired by 3D sensor such as a Time of Flight type or a Structured Light type, the information sensed by the magnetic sensor or the like.

In the above-described measuring apparatus, the angle control unit may control the emission angle of the light beam so that the light beam is emitted toward the virtual object or a position of the target. Thus, when the tracking of the target is released, by moving the target to the position of the virtual object, the target can be accurately moved to the position of the light beam, and it is possible to easily restore the tracking state.

In the above-described measuring apparatus, the display control unit may control the display unit to display the virtual object having a predetermined relative positional relationship with respect to a preset object, and the angle control unit may control the emission angle of the light beam so that the light beam is emitted toward the three-dimensional coordinate of the virtual object when the tracking of the target is restored from a state in which the tracking of the target is released. Thereby, when the tracking of the target is released, the light beam is emitted toward the virtual object, and the target can be easily moved to the position of the virtual object to restore the tracking state.

In the above-described measuring apparatus, the display control unit may perform control to display the three-dimensional coordinates of the target in the vicinity of the target in a superimposed manner. That is, in the video see-through system, the target is captured by the imaging unit and displayed on the display unit. In the optical see-through system, the target is transmitted through the display unit and enters the field of view of the measurer. On the other hand, the three-dimensional coordinates of the target are calculated by the calculation unit, and the calculated three-dimensional coordinates are superimposed and displayed on the target. Thus, by performing the measurement with the device is worn, the measurement result can be displayed near the measurement point, and the measurer can easily confirm the measurement result while performing the measurement.

In the above-described measuring apparatus, the display control unit may perform control to display a guide image for moving the target to a position of the light beam in a superimposed manner in the vicinity of the target. Thereby, since the guide image is superimposed and displayed on the display unit worn by the measurer, when the tracking state of the target is released, it is possible to restore the tracking state by moving the target along the guide image.

In the above-described measuring apparatus, the display control unit may perform control to superimpose and display an object image indicating a light receiving direction and a light receiving region of the target as the guide image on the target. Thereby, when the tracking of the target is released, the light receiving direction and the light receiving region are displayed in a superimposed manner on the target, and it becomes possible to restore the tracking state by moving the target using this guide image.

In the above-described measuring apparatus, the device may include a coordinate calculation unit that calculate a second three-dimensional coordinates of the target based on the sensing information for calculating the relative position of the target with respect to the device and the three-dimensional coordinates and the direction of the device, in addition to the first three-dimensional coordinates of the target based on the emission angle of the light beam and the light returning from the target. The coordinate calculation unit may calculate a third three-dimensional coordinate from the first three-dimensional coordinate and the second three-dimensional coordinate. Thereby, when the tracking of the target is released, the three-dimensional coordinates of the target can be grasped on the device side, and the guide image can be displayed appropriately.

In the above-described measuring apparatus, the three-dimensional coordinates of the device may be corrected based on a difference between the first three-dimensional coordinates and the second three-dimensional coordinates.

DETAILED DESCRIPTION OF THE EMBODIMENTS

Figure 1:
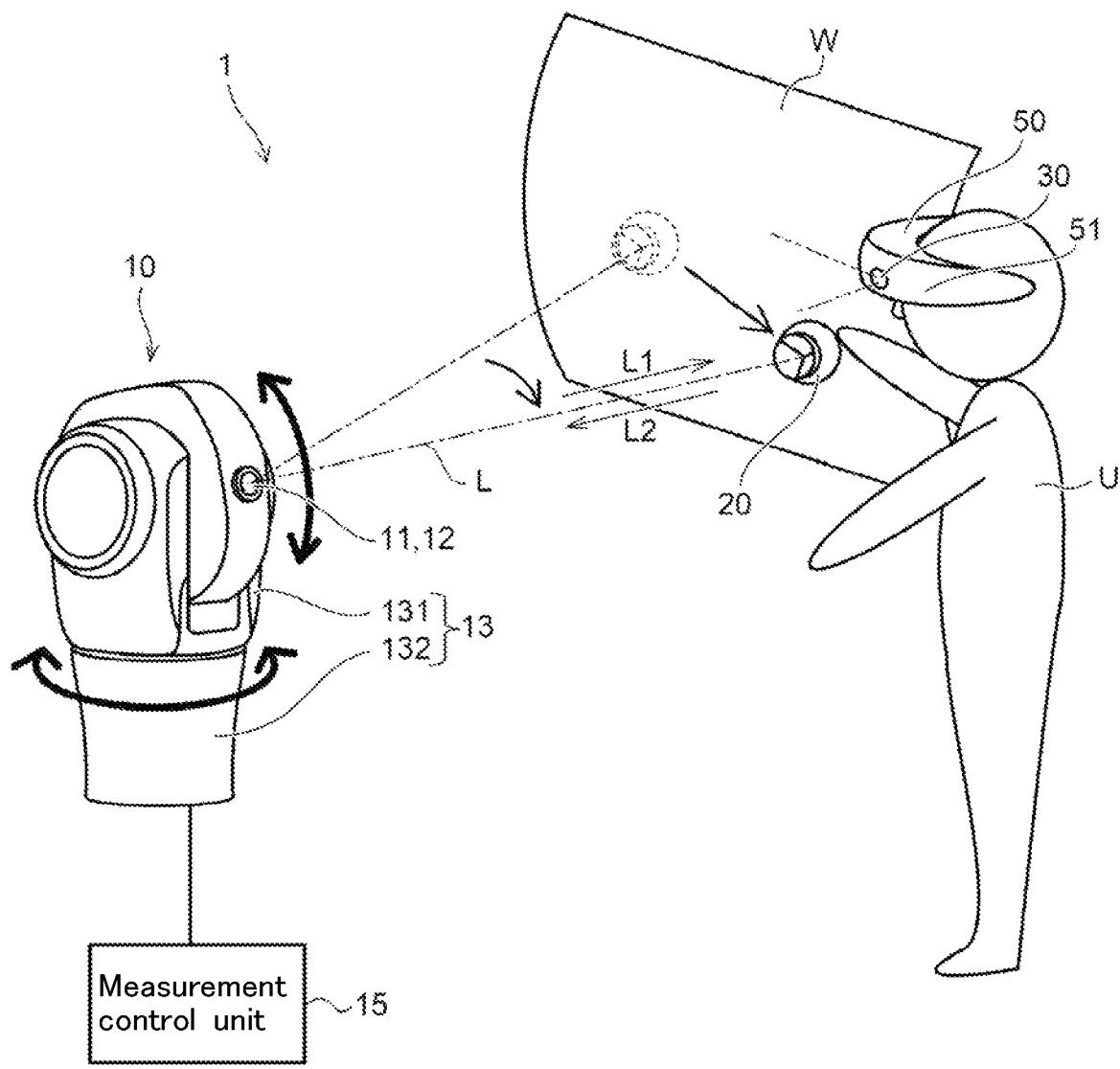
FIG. 1 is a schematic diagram illustrating a configuration of a measuring apparatus according to the present embodiment.

Embodiments of the present invention will be described below with reference to the drawings. In the following description, portions already described are denoted by the same reference numerals, and description thereof is omitted.

Configuration of the Measuring Apparatus

FIG. 1 is a schematic diagram illustrating a configuration of a measuring apparatus according to the present embodiment.

The measuring apparatus according to the present embodiment measures three-dimensional coordinates of the target 20 by emitting a light beam toward the target 20 held by the measurer U and capturing and tracking the target. When the target 20 is in the tracking state, the measuring apparatus 1 can measure the three-dimensional coordinates of the target 20. Therefore, by contacting the target 20 in the tracking state to the measurement point of an object W, three-dimensional coordinates of a measurement point of the object W can be obtained from the three-dimensional coordinates of the target 20. Hereinafter, the three-dimensional coordinates calculated by using the light beam irradiated to the target 20 may be referred to as "first three-dimensional coordinates" by distinguishing them from the three-dimensional coordinates calculated by another method.

The measuring apparatus 1 includes an apparatus body 10 constituting an optical interferometer. The apparatus body 10 is provided with a light source 11 for emitting a light beam, a light receiving unit 12 for receiving the light beam emitted from the light source 11 and reflected by the target 20, and a drive unit 13 for changing angles of the light source 11 and the light receiving unit 12. When tracking the target 20, the angles of the light source 11 and the light receiving unit 12 are changed by the driving unit 13 so that the light beam emitted from the light source 11 is always irradiated to the target 20.

A measurement control unit 15 is connected to the apparatus body 10. Each part of the apparatus body 10 is controlled by the measurement control unit 15. The measurement control unit 15 may be configured by a personal computer. The configuration of the measurement control unit 15 will be described later.

As the light beam emitted from the light source 11 of the apparatus body 10, for example, laser beam L is used. For convenience of explanation, the laser beam L emitted from the light source 11 will be referred to as laser beam L1, and the laser beam L reflected by the target 20 will be referred to as laser beam L2.

The target 20 is, for example, a retroreflector. When the laser beam L1 emitted from the light source 11 is reflected by the target 20, the laser beam L2 returns to the apparatus body 10 along the same optical path as the laser beam L1. The light receiving unit 12 of the apparatus body 10 controls the drive unit 13 so as to track the moving target 20 using the interference between the laser beams L1 and L2 while measuring the distance between the apparatus body 10 and the target 20.

The drive unit 13 includes a first drive unit 131 for changing the angles of the light source 11 and the light receiving unit 12 around the first axis and a second driving unit 132 for changing the angles of the light source 11 and the light receiving unit 12 around the second axis perpendicular to the first axis. For example, the first drive unit 131 is an azimuth encoder for changing the azimuth angle, the second drive unit 132 is an elevation encoder for changing the elevation angle. When tracking the target 20, the first drive unit 131 and the second drive unit 132 are interlocked to adjust the emission angle (azimuth angle and elevation angle) of the light source 11 so that the laser beam L1 is always irradiated to the target 20.

When measuring the three-dimensional coordinates of the object W, the measurer U holds the target 20 and bring the target 20 into contact with the measurement point of the object W. The three-dimensional coordinates of the target 20 are measured at a predetermined timing while the target 20 is being tracked by the apparatus body 10. After the measurement of one measurement point is completed, the measurer U moves the target 20 to the next measurement point. During this movement, the apparatus body 10 continues to track the target 20, and measures the three-dimensional coordinates of the target 20 while the target 20 moves to the next measurement point. By repeating this process, the three-dimensional coordinates of the object W can be measured.

In addition, the measuring apparatus 1 according to the present embodiment includes an imaging unit 30 and display unit 51. The imaging unit 30 and the display unit 51 are provided in the head-mounted display 50 which is an example of a device that is wearable by the measurer U. The image captured by the imaging unit 30 is displayed on the display unit 51 of the head-mounted display 50. The measurer U wears the head-mounted display 50 and performs measurement while referring to the image displayed on the display unit 51.

Block Configuration of the Measuring Apparatus

Next, a block configuration of the measuring apparatus 1 will be described.

Figure 2:
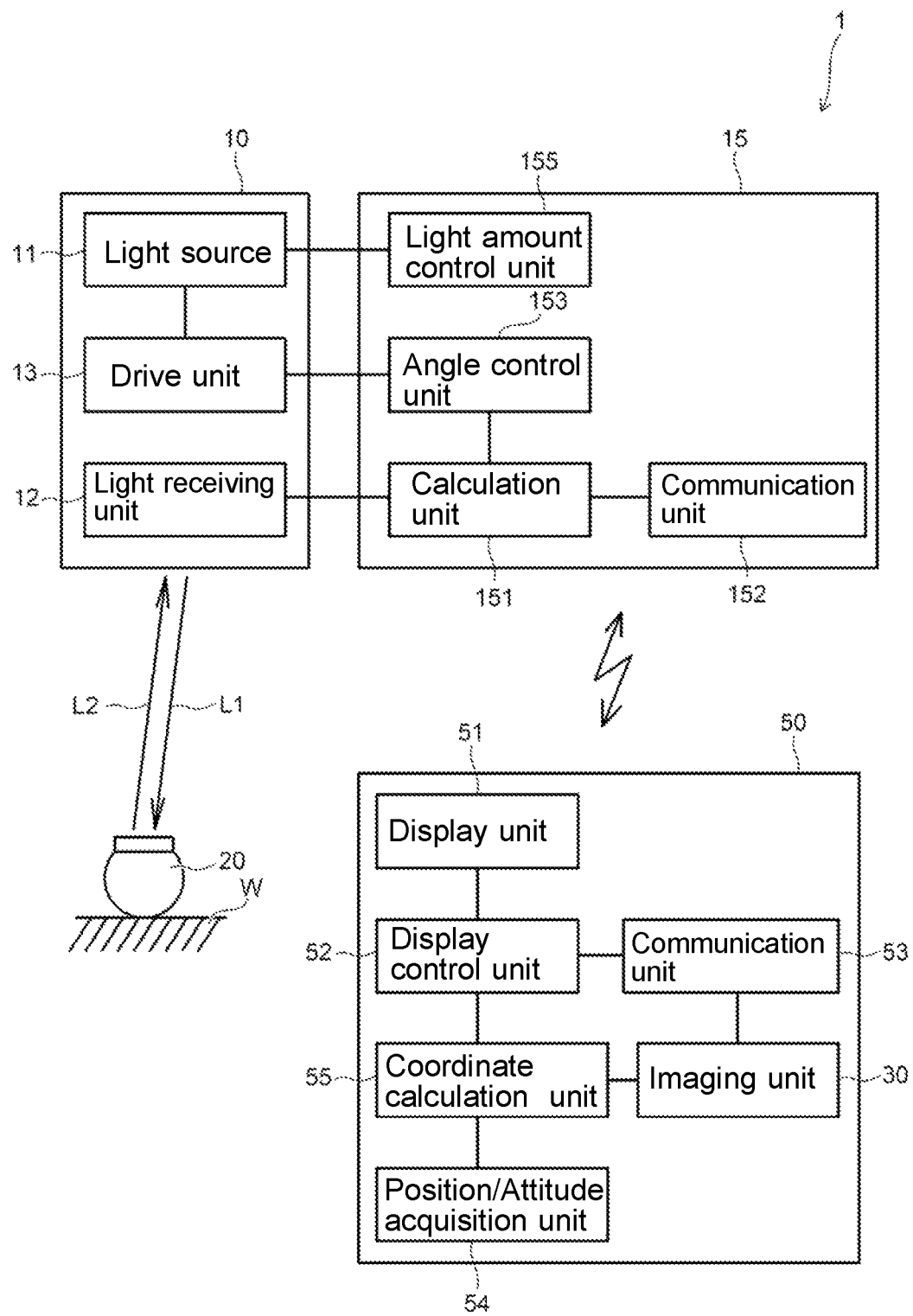
FIG. 2 is a block diagram illustrating a configuration of the measuring apparatus according to the present embodiment.

FIG. 2 is a block diagram illustrating a configuration of the measuring apparatus according to the present embodiment.

The measurement control unit 15 of the measuring apparatus 1 has a calculation unit 151, a communication unit 152, an angle control unit 153 and the light amount control unit 155. The calculation unit 151 calculates the three-dimensional coordinates based on a signal output from the light receiving unit 12 that has received the laser beam L2. The calculation unit 151 calculates the three-dimensional coordinates of the target 20 based on the emission angle of laser beam L1 and the laser beam L2 returning from the target 20. The communication unit 152 performs information communication with external devices by wireless or wired communication. The communication unit 152 performs information communication with, for example, the head-mounted display 50.

The angle control unit 153 controls the angle of the light source 11 by controlling the drive unit 13. The angle control unit 153 gives angle setting signals to each of the first drive unit 131 and the second drive unit 132 of the drive unit 13 in order to adjust the angle of the light source 11 (the emission angle of the laser beam L1) for tracking the target 20 based on the signal sent from the calculation unit 151.

The light amount control unit 155 controls the amount of light of the laser beam L1 emitted from the light source 11. That is, the light amount control unit 155 sends a signal for light amount control to the light source 11 based on a predetermined condition, and controls the amount of emitted light of the laser beam L1.

The head-mounted display 50 includes the imaging unit 30, the display unit 51, a display control unit 52 and a communication unit 53. The imaging unit 30 is provided in the front side of the head-mounted display 50 to acquire an image in a direction facing the head of the measurer U. The display unit 51 displays an image imaged by the imaging unit 30, information sent from the measurement control unit 15, and various other information. The display control unit 52 controls the display unit 51. That is, the display control unit 52 send information to the display unit 51 to control the content to be displayed. The communication unit 53 performs information communication with external devices by wireless or wired communication. The communication unit 53 performs information communication with, for example, the measurement control unit 15.

The head-mounted display 50 further comprises a position/attitude acquisition unit 54 and a coordinate calculation unit 55. The position/attitude acquisition unit 54 acquires the three-dimensional coordinates and attitude (direction) of the head-mounted display 50. The position/attitude acquisition unit 54 may acquire the three-dimensional coordinates and orientation of the head-mounted display 50 in any manner. For example, the position/attitude acquisition unit 54 may acquire the three-dimensional coordinates of the head-mounted display 50 based on the image captured by the imaging unit 30 and/or other information (such as distance measurement information). Further, the position/attitude acquisition unit 54 may, for example, acquires the attitude of the head-mounted display 50 by using an acceleration sensor, a gyro sensor, or the like (not shown).

The coordinate calculation unit 55 calculates the three-dimensional coordinates of the target 20 based on the image of the target 20 captured by the imaging unit 30 and the three-dimensional coordinates and attitude (direction) of the head-mounted display 50. Hereinafter, the three-dimensional coordinates of the target 20 calculated based on the image of the target 20 captured by the imaging unit 30 and the three-dimensional coordinates and attitude (direction) of the head-mounted display 50 may be referred to as "second three-dimensional coordinates" by distinguishing them from the three-dimensional coordinates calculated by another method. Though the second three-dimensional coordinates are less accurate than the first three-dimensional coordinates calculated by the calculation unit 151 based on the signal output from the light receiving unit 12 that receives the laser beam L2, the coordinates can be calculated even if the laser beam L2 is not tracking the target. The coordinate calculation unit may calculate third three-dimensional coordinates by the first three-dimensional coordinates and the second three-dimensional coordinates. For example, by combining the first three-dimensional coordinates immediately before the tracking is interrupted with the second three-dimensional coordinates which are updated even after the tracking is interrupted, the accuracy of the three-dimensional coordinates obtained after the tracking is interrupted can be enhanced.

When the laser beam L2 is tracking the target, the measuring apparatus 1 may perform various processes using the highly accurate first three-dimensional coordinates, and when the laser beam L2 is not tracking the target, the measuring apparatus may perform the processes using the second three-dimensional coordinates or the third three-dimensional coordinates. Incidentally, in the present example, the second three-dimensional coordinates are calculated by the coordinate calculation unit 55 included in the head-mounted display 50, but the information required for the calculation may be sent from the head-mounted display 50 to the measurement control unit 15, and the second three-dimensional coordinates may be calculated by the calculation unit 151 included in the measurement control unit 15.

It is ideal that the first three-dimensional coordinates and the second three-dimensional coordinates are completely coincident with each other, but in reality, a deviation occurs therebetween. As described above, the first three-dimensional coordinates of the target can be calculated with higher accuracy than the second three-dimensional coordinates. The main error factor of the second three-dimensional coordinates is the error contained in the three-dimensional coordinates of the head-mounted display 50 used for the calculation of the second three-dimensional coordinates. By utilizing this, it is preferable to perform a process of correcting the three-dimensional coordinates of the head-mounted display 50 so that the second three-dimensional coordinates coincide with the first three-dimensional coordinates.

Operation of the Measuring Apparatus

Next, the operation of the measuring apparatus 1 according to the present embodiment will be described.

Figure 3:
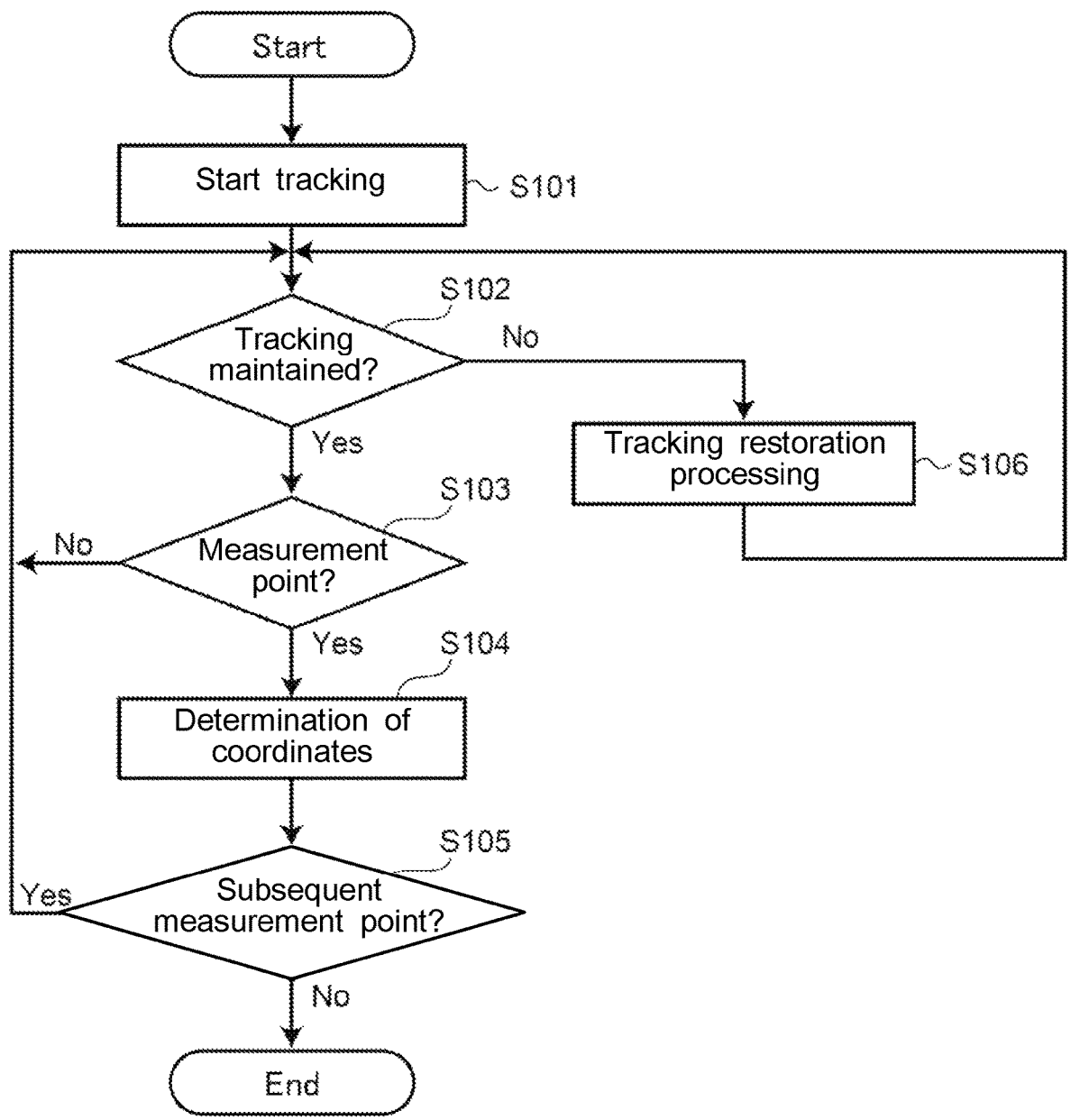
FIG. 3 is a flowchart illustrating the operation of the measuring apparatus according to the present embodiment.

FIG. 3 is a flowchart illustrating the operation of the measuring apparatus according to the present embodiment.

Figure 4:
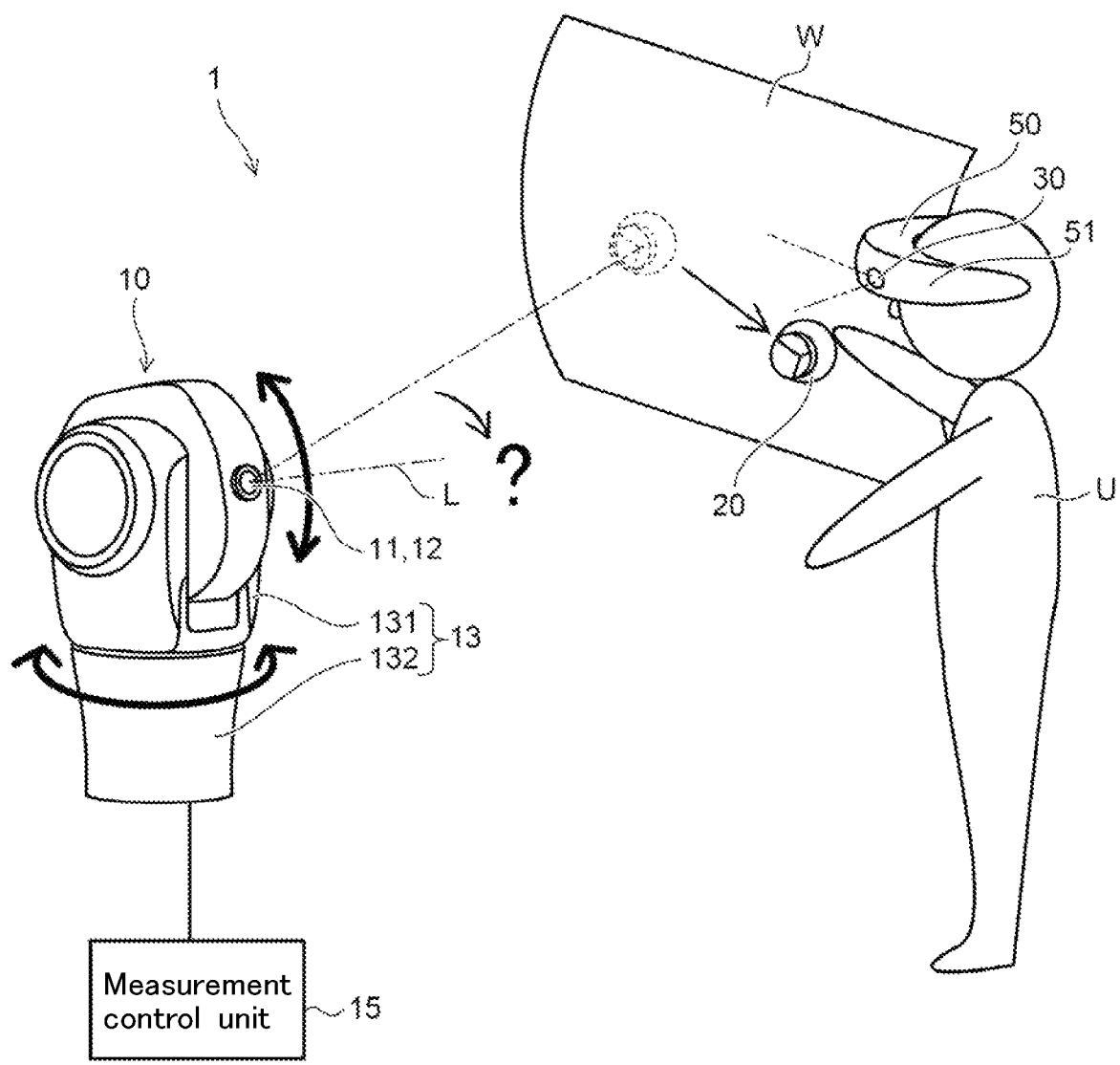
FIG. 4 is a schematic diagram illustrating the operation of the measuring apparatus.

FIG. 4 is a schematic diagram illustrating the operation of the measuring apparatus.

First, as shown in step S101 of FIG. 3, tracking is started. That is, the laser beam L1 is emitted from the light source 11 of the measuring apparatus 1, and the laser beam L2 reflected by the target 20 is received by the light receiving unit 12. A received light signal is processed by the calculation unit 151, and the calculation unit 151 gives an instruction to the angle control unit 153 so that continuously controls the angles of the light source 11 and the light receiving unit 12 to track the target 20.

In the tracking state, even if the target 20 held by the measurer U is moved, the angles of the light source 11 and the light receiving unit 12 are controlled in accordance with the movement, and the laser beam L1 is continuously emitted toward the target 20. In a state in which the target 20 is tracked, the three-dimensional coordinates of the target 20 are always calculated. That is, the laser light L2 reflected by the target 20 is received by the light receiving unit 12, and the three-dimensional coordinates of the target 20 are calculated based on the distance from the apparatus body 10 to the target 20 and the angles of the light source 11 and the light receiving unit 12. This calculation is performed by the calculation unit 151.

Next, as shown in step S102 of FIG. 3, it is determined whether tracking is maintained. If the tracking is maintained, it is determined whether or not the target 20 is located at the measurement point of the object W, as shown in step S103. For example, it is determined that the position of the target 20 is at the measurement point when the target 20 stops for a predetermined time. Alternatively, it may be determined that the target 20 is at the measurement point at the timing when a predetermined trigger signal is issued.

If it is determined that the target 20 is at the measurement point, the determination of the coordinates is performed as shown in step S104. That is, the three-dimensional coordinates of the target 20 is always calculated during the tracking state of the target 20. When it is determined that the target 20 is at the measurement point, the three-dimensional coordinates at the timing is determined as the coordinates of the measurement point.

After the measurement, as shown in step S105, it is determined whether or not there is a subsequent measurement point. If there is a subsequent measurement point, the process returns to step S102 and the subsequent steps are repeated.

Here, if the tracking of the target 20 is released for some reason while such measurements are being performed, it is determined No in step S102. FIG. 4 shows a state in which the tracking is released. In this case, the emission direction of the laser beam L1 does not follow the target 20, and the angles of the light source 11 and the light receiving unit 12 remain at that position. This is the so-called lost state.

When the tracking is released, a tracking restoration processing is performed as shown in step S106. The tracking restoration processing is a process in which the irradiation position of the laser beam L1 and the position of the target 20 are matched so that the laser beam L2 reflected by the target 20 can be received by the light receiving unit 12. For example, the target 20 held by the measurer U is moved so as to be aligned with the irradiation position of the laser beam L1. Alternatively, the calculation unit 151 recognizes the position of the measurer U or the target 20, and gives an instruction to the angle control unit 153 so that the laser beam L1 is irradiated to the position. The angles of the light source 11 and the light receiving unit 12 may be adjusted by the drive unit 13.

Next, the process returns to the step S102 of FIG. 3, and it is determined whether or not tracking is in progress. If tracking is in progress, the measurement from step S103 to step S105 is performed. If tracking is not in progress, the tracking restoration processing of step S106 is repeated until the tracking state is restored. By such an operation, the three-dimensional coordinates of the target 20 is measured while capturing and tracking the target 20 with a laser beam L.

Display Operation of the Optical Axis Graphic Image

Next, the display operation of the optical axis graphic image will be described.

Figure 5:
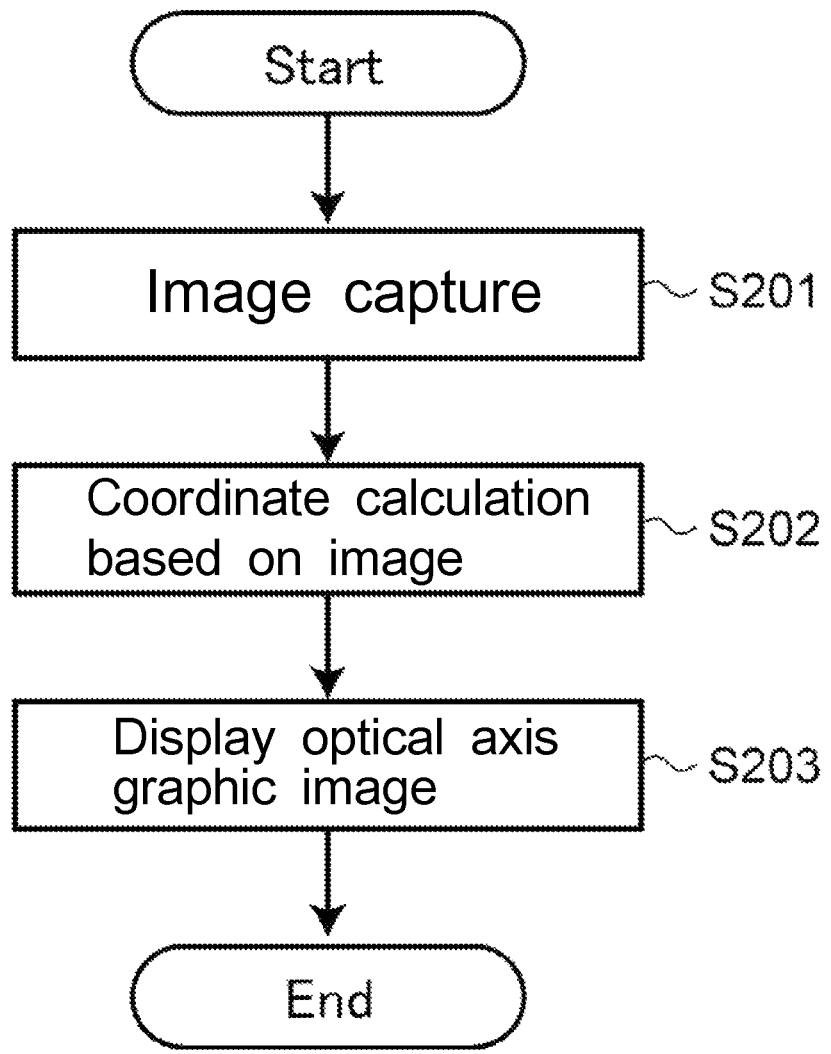
FIG. 5 is a flowchart illustrating an operation for superimposing and displaying the optical axis graphic image.

FIG. 5 is a flowchart illustrating an operation for superimposing and displaying the optical axis graphic image.

Figure 6:
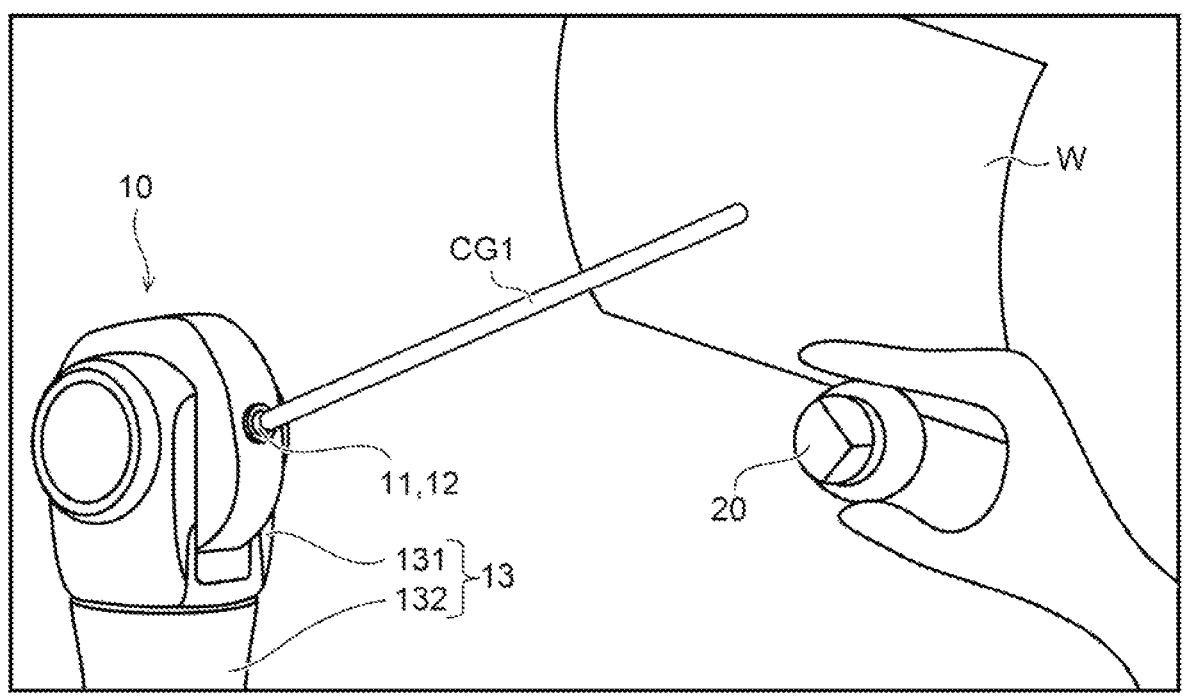
FIG. 6 is a schematic diagram illustrating an example of the superimposed display of the optical axis graphic image.

FIG. 6 is a schematic diagram illustrating an example of the superimposed display of the optical axis graphic image.

During the measurement by the measuring apparatus 1 (during the steps S101 to S105 in FIG. 3), the superimposed display of the optical axis graphic image shown in FIGS. 5 and 6 may be displayed regardless of whether the target 20 is being tracked or not being tracked, or may be displayed when tracking is released.

First, as shown in step S201 of FIG. 5, an image is captured. The image is captured by the imaging unit 30 provided on the head-mounted display 50. The image in front of the head-mounted display (the direction in which the measurer U is viewed) is captured by the imaging unit 30.

Next, as shown in step S202, a coordinate is acquired. Here, three-dimensional coordinates of the target 20 are acquired. In the tracking state of the target 20, since the three-dimensional coordinates of the target 20 is calculated by the calculation unit 151, the head-mounted display 50 receives the data of the three-dimensional coordinates transmitted from the communication unit 152 of the measurement control unit 15 by the communication unit 53. On the other hand, if the tracking of the target 20 is released, the coordinate calculation based on the image acquired by the imaging unit 30 (i.e., the calculation of the second three-dimensional coordinates by the coordinate calculation unit 55) is performed. The coordinate calculation unit 55 calculates the second three-dimensional coordinates of the target 20 based on the image captured by the imaging unit 30 and/or other information (such as distance measurement information).

Next, as shown in step S203, an optical axis graphic image CG1 is displayed. The display control unit 52 of the head-mounted display 50 performs control to superimpose and display the optical axis graphic image CG1 on a position corresponding to the optical axis of the laser beam L in the display region of the display unit 51 using the first three-dimensional coordinates of the target 20 calculated by the calculation unit 151 of the measurement control unit 15 and transmitted via the communication units 152 and 53 or the second three-dimensional coordinates calculated by the coordinate calculation unit 55.

As shown in FIG. 6, the superimposed display of the optical axis graphic image CG1 is performed in the form of augmented reality (AR). That is, the image of the real space captured by the imaging unit 30 of the head-mounted display 50 is displayed on the display unit 51. Further, the calculation unit 151 grasps the emission direction of the laser beam L1 based on control information by the angle control unit 153, and obtains coordinate information of an image displayed on the display unit 51 of the head-mounted display 50 and coordinate information of the target 20 displayed on the display unit 51. These pieces of information are sent to the display control unit 52 of the head-mounted display 50, and the optical axis graphic image CG1 is displayed in the form of the augmented reality.

In the example shown in FIG. 6, an optical axis graphic image CG1 corresponding to the optical axis of the laser beam L1 is displayed in a superimposed manner on the real image actually displayed (superimposed display). The measurer U can refer to the state in which the optical axis graphic image CG1 showing the optical axis of the laser beam L1 is superimposed on the image of the real space displayed on the display unit 51 of the head-mounted display 50. The locus of the laser beam L1 may be difficult to see depending on the wavelength and the usage environment. However, the measurer U can refer to the optical axis of the laser beam L1 as the optical axis graphic image CG1 on the display unit 51 by the augmented reality displayed. The optical axis graphic image CG1 is displayed at a position on the display unit 51 corresponding to the actual position of the optical axis of the laser beam L1.

In the augmented reality display, when the measurer U moves the position of the head-mounted display 50 (moves the direction of the head), the position of the optical axis graphic image CG1 moves in association with the movement of the image of the real space. When displaying the optical axis graphic image CG1 while tracking the target 20, the optical axis graphic image CG1 is superimposed and displayed on a line connecting the light source 11 and the target 20, and the optical axis graphic image CG1 is displayed so as to follow the target 20 as the target 20 moves.

On the other hand, when displaying the optical axis graphic image CG1 in a state where the tracking of the target 20 is released, the optical axis graphic image CG1 is displayed at the position of the optical axis when the tracking is released. Measuring person U can easily grasp the optical axis (trajectory) of the laser beam L1 which is hard to see actually by referring to the optical axis graphic image CG1 displayed at that position in a superimposed manner. Therefore, by moving the target 20 so as to match the optical axis graphic image CG1, it is possible to restore the tracking state easily.

In the above, an example in which the three-dimensional coordinates of the target 20 is calculated by the calculation unit 151 of the measurement control unit 15. However, the coordinate calculation unit may be provided in the head-mounted display 50, and the coordinate calculation unit may calculate the three-dimensional coordinates of the target 20. In this case, the three-dimensional coordinates of the target 20 is calculated by the coordinate calculation unit based on the image of the target 20 captured by the imaging unit 30 of the head-mounted display 50 and the three-dimensional coordinates and the direction of the head-mounted display 50. Thereby, even when the tracking of the target is released, the three-dimensional coordinates of the target 20 can be grasped on the head-mounted display 50 side, and the guide can be displayed appropriately.

Example of Other Operation

Next, an example of guiding operation in the measuring apparatus 1 according to the present embodiment will be described.

Figure 7:
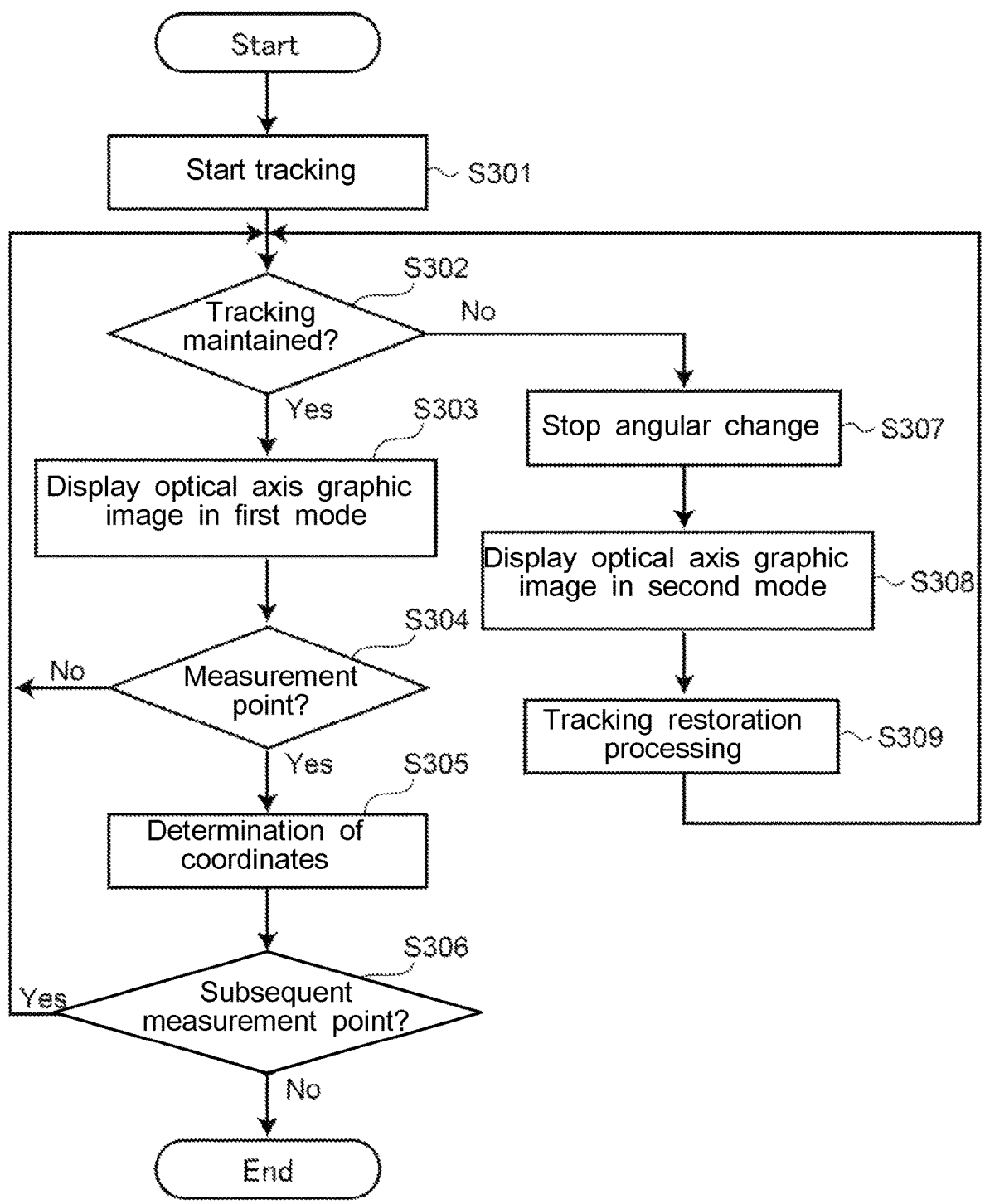
FIG. 7 is a flowchart illustrating the other operation.

FIG. 7 is a flowchart illustrating the other operation.

First, as shown in step S301, tracking is started. That is, the laser beam L1 is emitted from the light source 11 of the measuring apparatus 1, and the laser beam L2 reflected by the target 20 is received by the light receiving unit 12. A received light signal is processed by the calculation unit 151, and the calculation unit 151 gives an instruction to the angle control unit 153 so that continuously controls the angles of the light source 11 and the light receiving unit 12 to track the target 20. In a state in which the target 20 is tracked, the three-dimensional coordinates of the target 20 are always calculated by the calculation unit 151.

Next, as shown in step S302, it is determined whether the tracking is maintained. If the tracking is maintained, the optical axis graphic image CG1 is displayed in a first mode, as shown in step S303. The optical axis graphic image CG1 is superimposed on the image of the real space displayed on the display unit 51 of the head-mounted display 50 worn by the measurer U in a form of the augmented reality. In the tracking state, the optical axis graphic image CG1 is superimposed and displayed on a line connecting the light source 11 and the target 20. The measurer U can refer to the optical axis graphic image CG1 superimposed and displayed on the display unit 51 of head-mounted display 50 using the augmented reality, and grasp the position of the optical axis.

The optical axis graphic image CG1 in the tracking state is displayed in a first mode. In the first mode, for example, the optical axis graphic image CG1 is displayed in green. The measurer U can recognize that the target is in the tracking state by displaying the optical axis graphic image CG1 in the first mode.

Next, as shown in step S304, it is determined whether or not the target 20 is located at the measurement point of the object W. For example, it is determined that the position of the target 20 is at the measurement point when the target 20 stops for a predetermined time. Alternatively, it may be determined that the target 20 is at the measurement point at the timing when a predetermined trigger signal is issued.

If it is determined that the target 20 is at the measurement point, the determination of the coordinates is performed as shown in step S305. That is, the three-dimensional coordinates of the target 20 is always calculated during the tracking state of the target 20. When it is determined that the target 20 is at the measurement point, the three-dimensional coordinates at the timing is determined as the coordinates of the measurement point.

After the measurement, as shown in step S306, it is determined whether or not there is a subsequent measurement point. If there is a subsequent measurement point, the process returns to step S302 and the subsequent steps are repeated.

Here, if the tracking of the target 20 is released for some reason while such measurements are being performed, it is determined No in step S302. When the tracking is released, an angular change is stopped as shown in step S307. Thereby, the angle of the light source 11 and the light receiving unit 12 remains the angle at the timing when the tracking is released.

Next, as shown in step S308, the optical axis graphic image CG1 is displayed in a second mode. The second mode is a display format different from the first mode. In the second mode, for example, the optical axis graphic image CG1 is displayed in red. With display of the optical axis graphic image CG1 in the second mode on the display unit 51 of the head-mounted display 50, the measurer U can recognize that the tracking is released.

Next, as shown in step S309, a tracking restoration processing is performed. The tracking restoration processing is same as the tracking restoration processing shown in step S106 of FIG. 3. Next, the process returns to the step S302, and it is determined whether or not tracking is in progress. If tracking is in progress, the optical axis graphic image CG1 is changed to the display in the first mode (step S303), and the measurement of steps S304 to S306 is performed. If tracking is not in progress, the tracking restoration processing is repeated until the tracking state is restored.

In such an operation, the display mode of the optical axis graphic image CG1 changes (for example, the color changes) depending on whether the tracking of the target 20 is in progress or not. Therefore, the measurer U can easily determine whether the image is in the tracking state or the tracking released state according to the display mode of the optical axis graphic image CG1.

Example of Other Superimposed Display

Next, an example of other superimposed display in the measuring apparatus 1 according to the present embodiment will be described.

Figure 8:
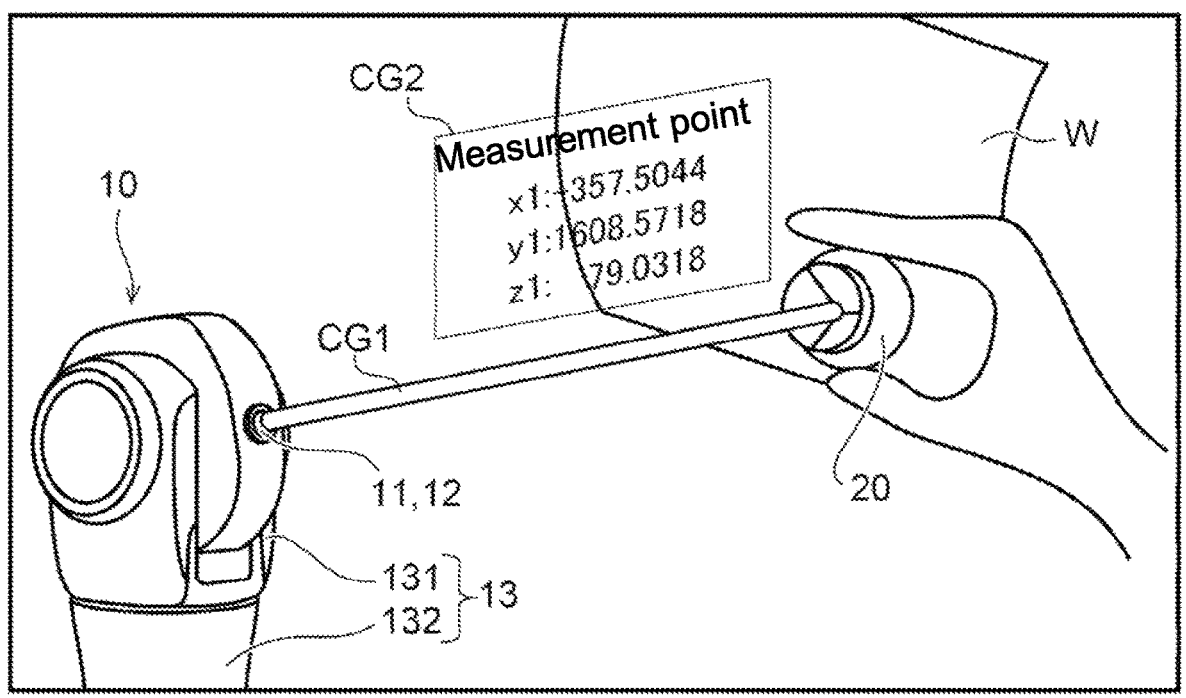
FIG. 8 is a schematic diagram illustrating an example of the other superimposed display.

FIG. 8 is a schematic diagram illustrating an example of the other superimposed display.

FIG. 8 shows an example of superimposing and displaying the measurement result of the object W. For example, when performing the calculation of the three-dimensional coordinates while contacting the target 20 to the measurement point of the object W, a graphic image CG2 indicating the three-dimensional coordinates which is the result of the calculation is superimposed and displayed in the vicinity of the actual image of the target 20 in the form of the augmented reality. Thereby, the measurer U can confirm the measurement result without looking away from the target 20 by referring to the optical axis graphic image CG2 of the measurement result displayed in the vicinity of the target 20.

Example of Other Tracking Restoration Processing

Next, an example of other tracking restoration processing in the measuring apparatus 1 according to the present embodiment will be described.

Figure 9:
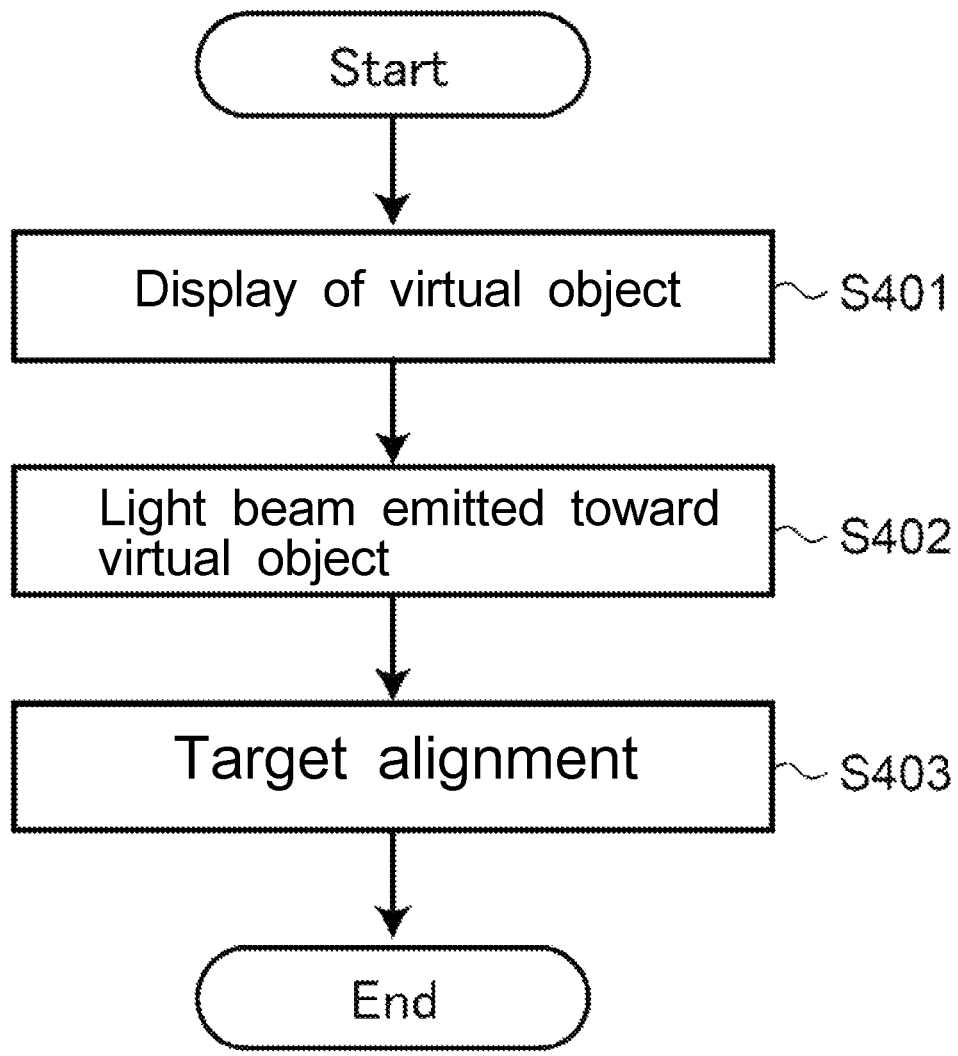
FIG. 9 is a flowchart illustrating the operation of the other tracking restoration processing.

FIG. 9 is a flowchart illustrating the operation of the other tracking restoration processing.

Figure 10A:
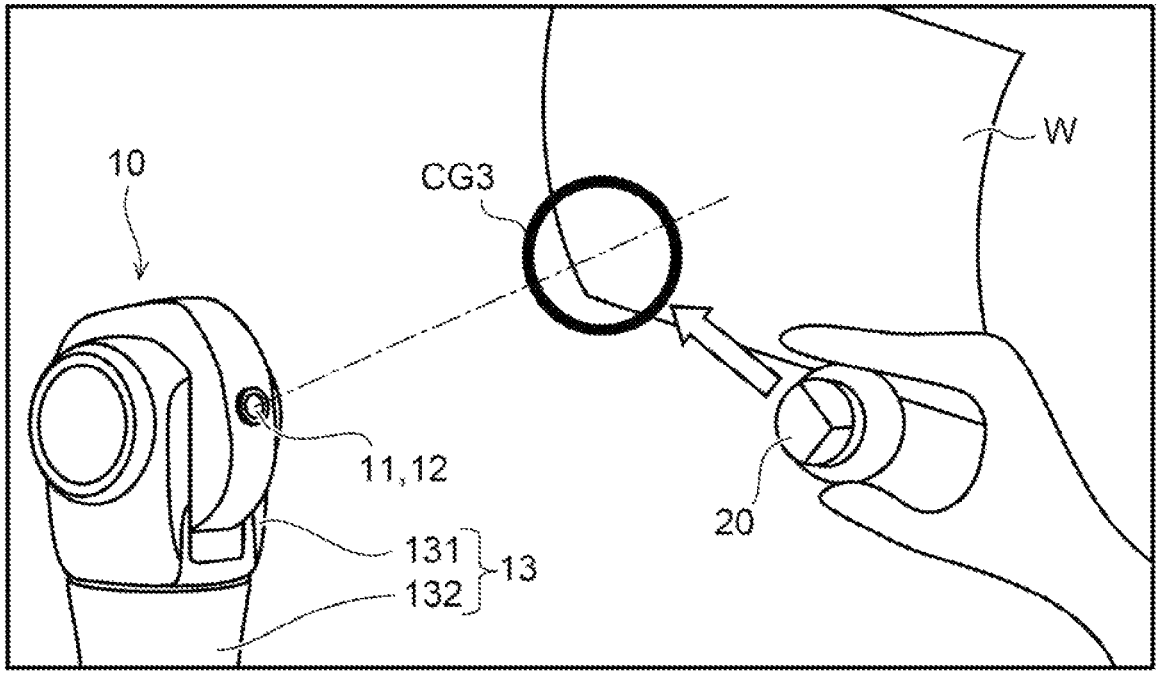
FIGS. 10A and 10B are schematic diagrams illustrating display examples of virtual objects.
Figure 10B:
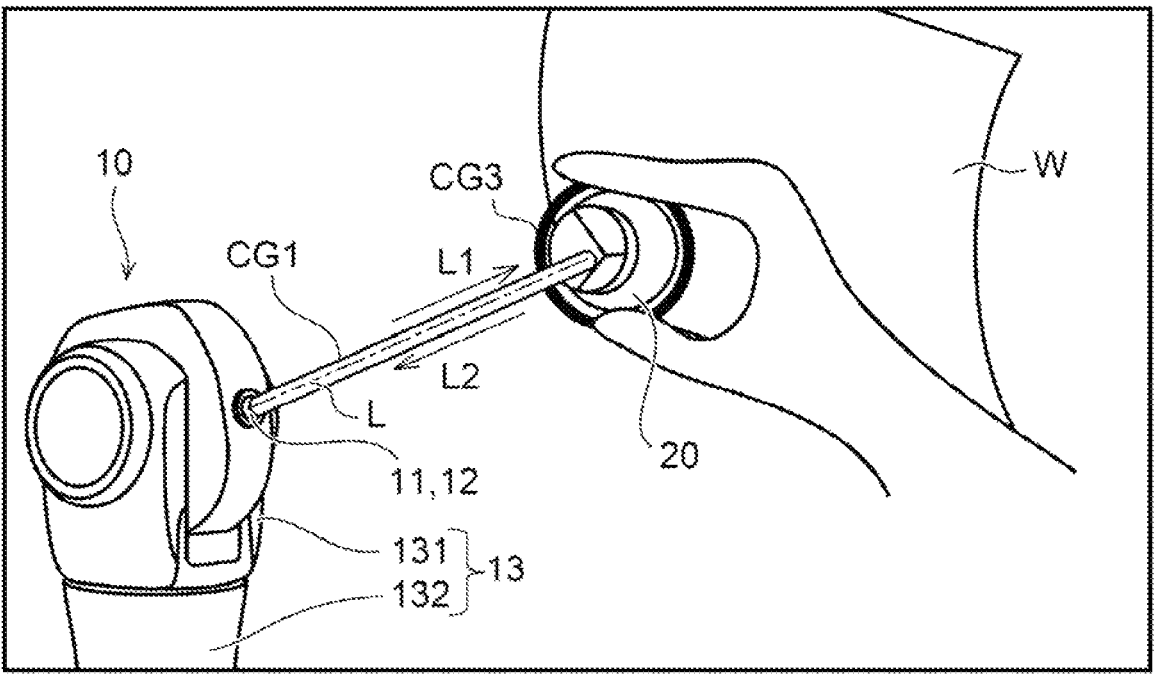

FIGS. 10A and 10B are schematic diagrams illustrating a display example of a virtual object having a predetermined relative positional relationship with respect to the object which is preset. Generally, it is convenient to set an object to be measured as the object, but not limited to the object to be measured, it is possible to set anything in the space as the object.

The process shown in FIG. 9 is included in the tracking restoration processing shown in step S106 of FIG. 3 or step S309 of FIG. 7.

First, when the tracking of the target 20 is released, the virtual object having a predetermined relative positional relationship with respect to the object is displayed as shown in step S401. FIG. 10A shows an example of a graphic image CG3 of the virtual object. Although the graphical images CG3 of the virtual objects may be of any form, it is preferable that the graphic image CG3 has a shape that facilitates alignment of the target 20 when performing tracking restoration. In the present embodiment, the virtual object of a sphere is used as an example.

The graphic image CG3 of the virtual object is displayed on the optical axis of the laser beam L1 of the timing when the tracking of the target 20 is released. That is, the graphic image CG3 of the virtual object is superimposed and displayed on the display unit 51 of the head-mounted display 50 in a form of the augmented reality.

Next, as shown in step S402 of FIG. 9, the light beam is emitted toward the virtual object. FIG. 10B shows an example in which the laser beam L is emitted toward the graphic image CG3 of the virtual object. Based on the three-dimensional coordinate of the graphic image CG3 of the virtual object sent from the calculation unit 151, the angle control unit 153 instructs the driving unit 13 to irradiate the laser beam L toward, for example, the center of the graphic image CG3 of the virtual object. Thereby, an angle of the light source 11 is adjusted, and the laser beam L is irradiated from the light source 11 toward the positions of the graphic images CG3 of the virtual object.

When irradiated with a laser beam L, the optical axis graphic image CG1 may be superimposed displayed. At this time, the optical axis graphic image CG1 may be displayed in the display mode indicating the tracking released state (the second mode).

Next, as shown in step S403 of FIG. 9, an alignment of the target 20 is performed. The measurer U moves the target 20 so as to align with the graphic image CG3 of the virtual object by using the graphic image CG3 of the virtual object superimposed on the display unit 51 in the augmented reality as a guide. Since the laser beam L is emitted toward the graphic image CG3 of the virtual object, by aligning the target 20 with the position of the graphic image CG3 of the virtual object, the laser beam L1 is surely irradiated onto the target 20, and the laser beam L2 reflected by the target 20 can be returned to the light receiving unit 12. Thereby, the tracking state of the target 20 can be restored.

As described above, when the tracking of the target 20 is released, by superimposing and displaying the graphic image CG3 of the virtual object that serves as a guide for the tracking restoration in virtual reality, it is possible to easily grasp at which position the target 20 should be aligned to restore the tracking.

Example of Another Tracking Restoration Processing

Next, an example of another tracking restoration processing in the measuring apparatus 1 according to the present embodiment will be described.

The another tracking restoration processing is performed when the tracking is released (NO in step S102 shown in FIG. 3). In this case, first, imaging by the imaging unit 30 is performed. That is, using the imaging unit 30 of the head-mounted display 50 worn by the measurer U, the measurer U captures an image of the vicinity of the target 20 and the target 20 itself.

Next, coordinate calculation is performed. The coordinate calculation unit 55 calculates the three-dimensional coordinates of the target 20 based on the image captured by the imaging unit 30 and/or other information (such as distance measurement information), and the three-dimensional coordinates and attitude (direction) of the head-mounted display 50 acquired by the position/attitude acquisition unit 54.

Next, the emission angle of the light source 11 is adjusted. That is, in a state where the tracking is released, the emission angle of the light source 11 is adjusted in a predetermined direction, and the laser beam L1 is emitted. Here, the angle of the light source 11 is adjusted so as to emit a laser beam L1 in the three-dimensional coordinates of the target 20 calculated previously. Thereby, even when the tracking is released, the coordinate calculation unit 55 can calculate the three-dimensional coordinates (second three-dimensional coordinates) of the target 20 using the three-dimensional coordinates of the head-mounted display 50 and the image captured by the imaging unit 30 or the like, and the emission angle of the laser beam L1 can be automatically adjusted toward the position of the second three-dimensional coordinates so that the tracking of the target 20 can be quickly restored.

Other Example of Guide Operation

Next, another example of guiding operation in the measuring apparatus 1 according to the present embodiment will be described.

Figure 11:
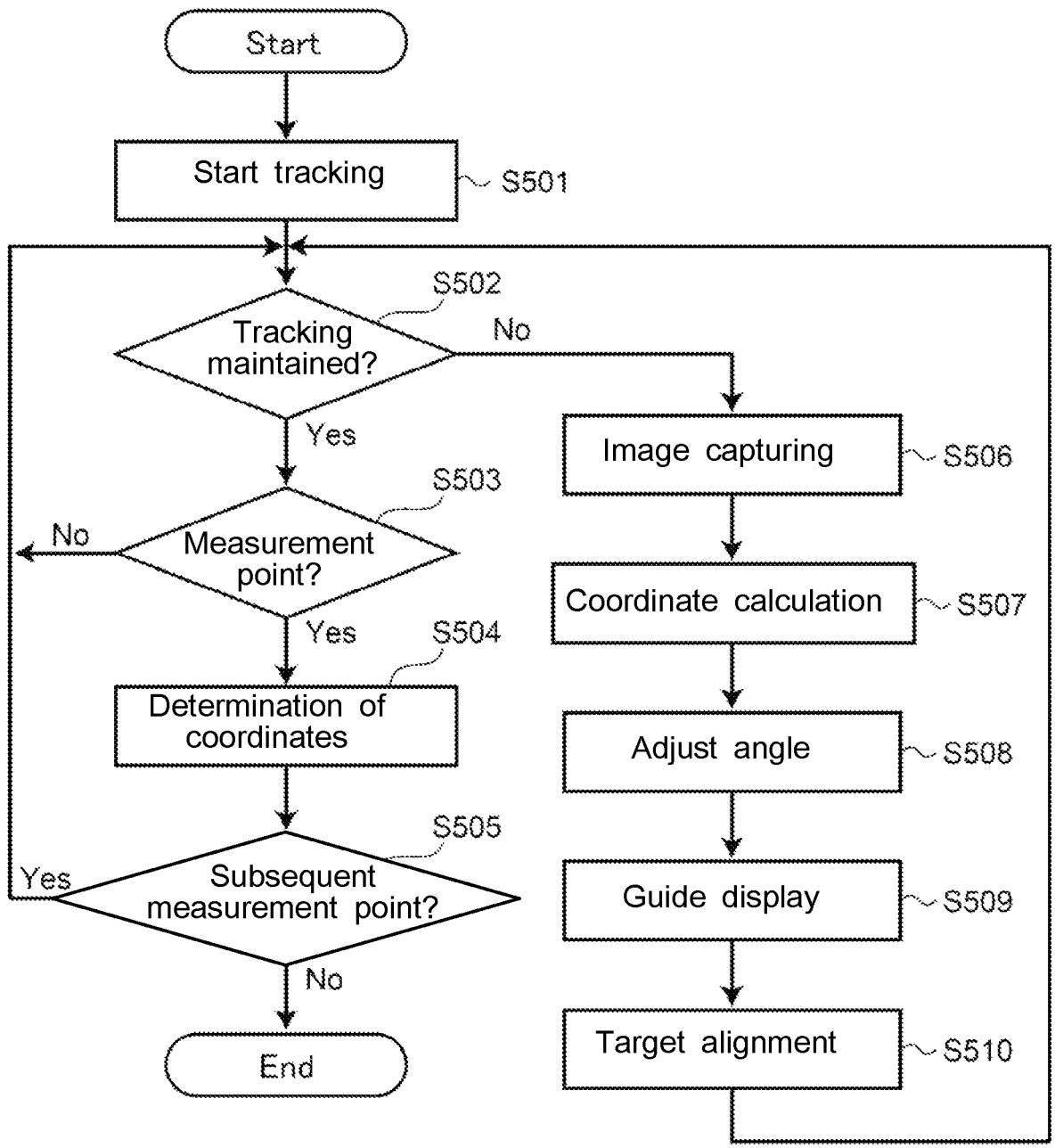
FIG. 11 is a flowchart illustrating another example of the guiding operation.

FIG. 11 is a flowchart illustrating another example of the guiding operation.

Figure 12A:
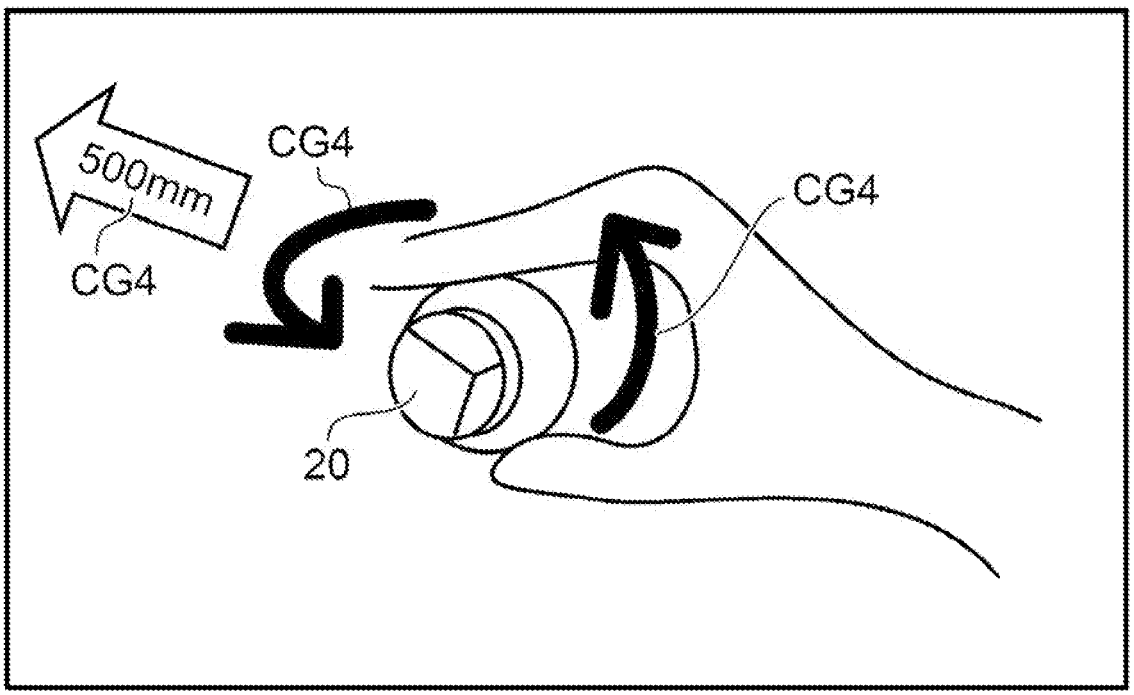
FIGS. 12A and 12B are schematic diagrams illustrating the guiding operation.
Figure 12B:
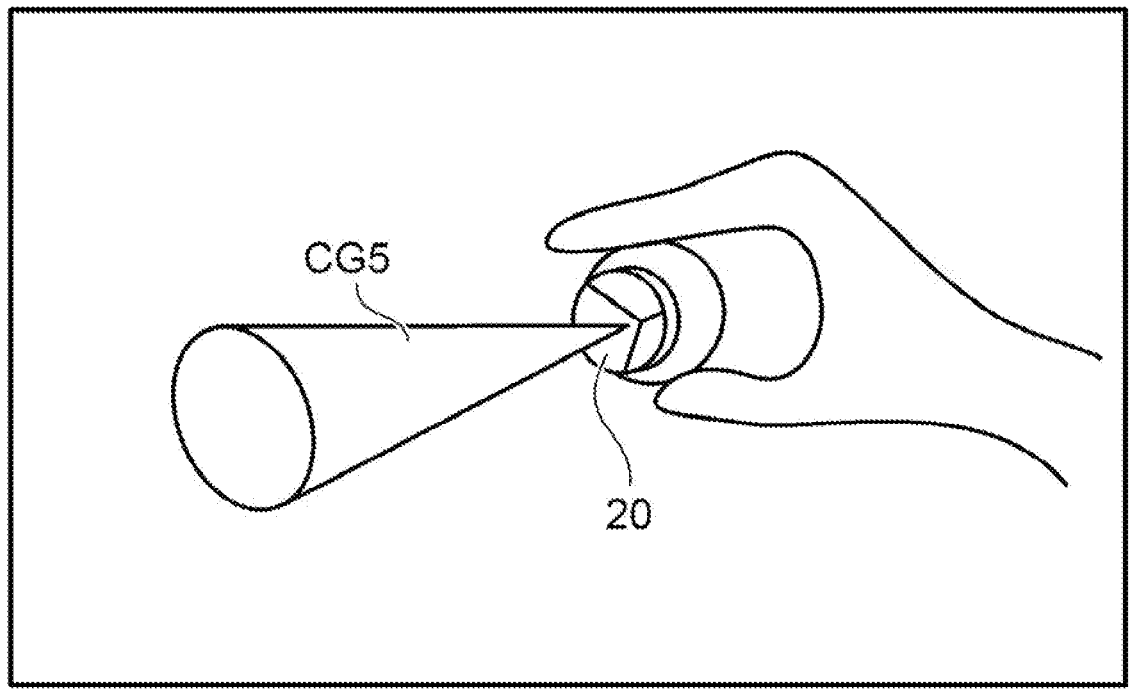

FIGS. 12A and 12B are schematic diagrams illustrating the guiding operation.

Since the processing from step S501 to step S505 shown in FIG. 11 is the same as the processing from steps S101 to S105 shown in FIG. 3, descriptions thereof are omitted.

When the tracking of the targets 20 is released (No in the determination of step S502), the imaging unit 30 performs imaging as shown in step S506. That is, using the imaging unit 30 of the head-mounted display 50 worn by the measurer U, the measurer U captures an image of the vicinity of the target 20 and the target 20 itself.

Next, as shown in step S507, coordinate calculation is performed. The coordinate calculation unit 55 calculates the three-dimensional coordinates of the object captured by the imaging unit 30 based on the image captured by the imaging unit 30 and/or other information (such as distance measurement information).

Next, as shown in step S508, the emission angle of the light source 11 is adjusted. That is, in a state where the tracking is released, the emission angle of the light source 11 is adjusted in a predetermined direction, and the laser beam L1 is emitted. For example, the angle of the light source 11 is adjusted so as to emit the laser beam L1 to the three-dimensional coordinates of the predetermined object calculated in step S507 described above. The object to be irradiated with the laser light L1 may be an object that is preset by performing recognition based on the image captured by the imaging unit 30. For example, by recognizing the image of the target 20, and emits a laser beam L1 toward the recognized target 20 or its vicinity. Note that step S508 may be omitted.

Next, the guide display shown in step S509 is performed. That is, the display control unit 52 performs control to display a guide image for irradiating the laser beam L1 to the target 20 in a superimposed manner on the image to be displayed on the display unit 51. Examples of the superimposed display of the guide image will be described later.

Next, as shown in step S510, an alignment of the target 20 is performed. The measurer U moves the target 20 to match the irradiation position of the laser beam L1 with reference to the guide image displayed on the display unit 51. Thereby, the tracking state of the target 20 can be restored.

Here, examples of superimposed displays of guide image shown in steps S509 will be described. The guide image is displayed in a superimposed manner in the form of augmented reality. The head-mounted display 50 is provided with the imaging unit 30, and the image of the real space captured by the imaging unit 30 is displayed on the display unit 51. Further, the calculation unit 151 of the measurement control unit 15 obtains information of the emission direction of the laser beam L1. This information is sent to the display control unit 52 of the head-mounted display 50. The coordinate calculation unit 52 obtains the coordinate information of the image displayed on the display unit 51 of the head-mounted display 50 and the coordinate information (i.e., the second three-dimensional coordinates) of the target 20 calculated by the coordinate calculation unit 55. The display control unit 52 makes the display unit 51 to display the guide image in the form of the augmented reality based on these pieces of information.

In the examples shown in FIG. 12A, a graphic image CG4 that guides one or more of a direction, an angle, and a distance to move the target 20 is superimposed and displayed on the real image of the target 20. The graphic image CG4 is, for example, an image of a geometrical figure such as an arrow, and is displayed in the vicinity of the real image of the target 20 in a superimposed manner. By the display of the direction and distance by the arrow, the measurer U can recognize the direction and the distance to move the target 20 even when the optical axis graphic image CG1 is outside the display range of the display unit 51.

That is, when the image of the target 20 is displayed on the display unit 51 of the head-mounted display 50, the graphic image CG4 is superimposed and displayed in the vicinity of the image. By capturing the image of the target 20 by the imaging unit 30, the calculation unit 151 recognizes the direction of the target 20 (the direction of the reflector) and recognizes a direction in which the target should be directed to receive the laser beam L1.

The graphic image CG4 is displayed so as to indicate a moving direction of the target 20 required to receive the laser beam L1. Therefore, by the measurer U moving the target 20 according to the graphic image CG4, it is possible to restore the tracking state easily.

In the examples shown in FIG. 12B, a graphic image CG5 for indicating the light receiving range of the target 20 is superimposed on a real image of the target 20. The graphic image CG5 is, for example, an image of a geometrical figure such as a conical shape image corresponding to the light receiving range capable of tracking the target 20, and is displayed on the actual light receiving range of the target 20 in a superimposed manner.

Similar to the examples shown in FIG. 12A, when the image of the target 20 is displayed on the display unit 51 of the head-mounted display 50, the graphic image CG5 is displayed in the vicinity of the image. By capturing the image of the target 20 by the imaging unit 30, the calculation unit 151 recognizes the direction of the target 20 (the direction of the reflector) and grasps the light receiving range based on the recognized direction of the target 20.

The graphic image CG5 is displayed so as to indicate the light receiving range of the target 20 required to receive the laser beam L1. Therefore, by the measurer U moving the target 20 according to the graphic image CG5, it is possible to restore the tracking state easily.

As described above, according to the embodiment, the tracking state of the target 20 can be grasped easily, and when the tracking state of the target 20 is interrupted, the measurer U can easily make the measuring apparatus to restore the tracking state. This makes it possible to improve the working efficiency of the measurement of the three-dimensional coordinates of the object W.

Modification of Embodiment

Although the present embodiment has been described above, the present invention is not limited to these examples. For example, in the present embodiment, the example in which the measurer U holds the target 20 and performs the measurement has been described. However, the present invention can be applied to a case where the target 20 is attached to a self-propelled robot such as a moving mechanism with a multi-axis arm and measurement is performed thereby. The shape of the graphic images in the guide display is not limited to the examples described above.

Further, in the above-described embodiment, although the augmented reality is realized by the head-mounted display 50 of the so-called video see-through system in which an image of a virtual object or the like is superimposed and displayed on an image of the real space captured by the imaging unit 30 on the display unit 51, the head-mounted display of the optical see-through system may be used.

Further, an invention in which a person skilled in the art appropriately add, delete, or change the design of the above-described embodiments, or a combination of the features of the respective embodiments as appropriate is also included in the scope of the present invention as long as it has the gist of the present invention.

What is claimed is:

1. A measuring apparatus that emits a light beam toward a target, captures and tracks the target when moved, and measures one or more three-dimensional coordinates of the target, comprising:
    a light source for emitting the light beam; an angle control unit for controlling an emission angle of the light beam emitted from the light source so as to track the moved target;
    a display provided on a device that is wearable by a measurer;
    a calculation unit for calculating a first three-dimensional coordinates of the target based on the emission angle of the light beam and the light returning from the target; and
    a display control unit that controls information displayed on the display unit based on the first three-dimensional coordinates calculated by the calculation unit, wherein the display control unit controls the display to superimpose and display an optical axis graphic image on a position of an optical axis of the light beam.

2. The measuring apparatus according to claim 1, wherein the angle control unit stops a change of the emission angle of the light beam when the tracking of the target is released, and
    the display control unit maintains the superimposed display of the optical axis graphic image at a time when the tracking of the target is released.

3. The measuring apparatus according to claim 1, wherein the display control unit controls the display to superimpose and display the optical axis graphic image in a first mode when the target is being tracked, and to display the optical axis graphic image in a second mode that is different from the first mode when the tracking of the target is released.

4. The measuring apparatus according to claim 1, wherein the device includes:
    a sensor that acquires sensing information for calculating a relative position of the target with respect to the device; and
    a coordinate calculation unit that calculates a second three-dimensional coordinates of the target based on the sensing information acquired by the sensor and the first three-dimensional coordinates and direction of the device, and
    wherein the display control unit controls the display to superimpose and display a virtual object indicating a region in which the target can receive the light beam on the target in a state where the tracking of the target is released.

5. The measuring apparatus according to claim 4, wherein the angle control unit controls the emission angle of the light beam so that the light beam is emitted toward a position of the virtual object or the target based on the second three-dimensional coordinates of the target.

6. The measuring apparatus according to claim 1, wherein
the display control unit controls the display to display a virtual object having a predetermined relative positional relationship with respect to a physical object on the display, and
the angle control unit controls the emission angle of the light beam so that the light beam is emitted toward the first three-dimensional coordinates of the virtual object when the tracking of the target is restored from a state where the tracking is being released.

7. The measuring apparatus according to claim 1, wherein the display control unit controls the display to superimpose and display the first three-dimensional coordinates of the target.

8. The measuring apparatus according to claim 1, wherein the display control unit controls the display to superimpose and display a guide image that guides one or more of a direction, an angle, and a distance to move the target in a vicinity of the image of the target displayed on the display unit.

9. The measuring apparatus according to claim 8, wherein the display control unit controls the display to superimpose and display an object image indicating a light receiving direction and a light receiving region of the target as the guide image on the target.

10. The measuring apparatus according to claim 1, wherein
the device includes a coordinate calculation unit that calculates a second three-dimensional coordinates of the target based on the first three-dimensional coordinates and direction of the device and sensing information for calculating a relative position of the target with respect to the device, and
the device uses, as the three-dimensional coordinates of the target, any of the first three-dimensional coordinates, the second three-dimensional coordinates, and a third three-dimensional coordinates which are based on the first three-dimensional coordinates and the second three-dimensional coordinates of the target.

11. The measuring apparatus according to claim 10, wherein the three-dimensional coordinates of the device are corrected based on a difference between the first three-dimensional coordinates and the second three-dimensional coordinates.

* * * * *